(12) United States Patent
Tsai et al.

(10) Patent No.: US 12,742,681 B2
(45) Date of Patent: Sep. 22, 2026

(54) OPTICAL DETECTOR FOR DETECTING GAS AND SUSPENDED MATTER

(71) Applicant: CALYX, INC., Berkeley, CA (US)

(72) Inventors: Ming-Yuan Tsai, New Taipei City (TW); Po Jui Chiu, Berkeley, CA (US); Benson Fan, Berkeley, CA (US); Chun-Yi Leu, Taipei City (TW)

( * ) Notice: Subject to any disclaimer, the term of this patent is extended or adjusted under 35 U.S.C. 154(b) by 717 days.

(21) Appl. No.: 17/794,193

(22) PCT Filed: Jan. 20, 2021

(86) PCT No.: PCT/US2021/014210
§ 371 (c)(1),
(2) Date: Jul. 20, 2022

(87) PCT Pub. No.: WO2021/150624
PCT Pub. Date: Jul. 29, 2021

(65) Prior Publication Data
US 2023/0057800 A1 Feb. 23, 2023

Related U.S. Application Data

(60) Provisional application No. 62/963,411, filed on Jan. 20, 2020.

(51) Int. Cl.
*G01J 3/42* (2006.01)
*G01J 3/02* (2006.01)
(Continued)

(52) U.S. Cl.
CPC ............... *G01J 3/42* (2013.01); *G01J 3/0297* (2013.01); *G01N 21/783* (2013.01); *G01N 2021/7773* (2013.01)

(58) Field of Classification Search
CPC .......... G01J 3/42; G01J 1/4228; G01J 3/0297; G01J 1/0295; G01J 1/48; G01J 3/0294;
(Continued)

(56) References Cited

U.S. PATENT DOCUMENTS 3,861,809 A * 1/1975 Hall, Jr. ............... G01N 21/031 356/418
4,591,721 A * 5/1986 Wong ...................... G01J 3/433 250/373
(Continued)

FOREIGN PATENT DOCUMENTS

JP 10232211 A * 9/1998
JP 2003310578 A * 11/2003

OTHER PUBLICATIONS

Qiulin Tan, Licheng Tang, Mingliang Yang, Chenyang Xue, Wendong Zhang, Jun Liu, Jijun Xiong, Three-gas detection system with IR optical sensor based on NDIR technology, Optics and Lasers in Engineering, vol. 74, 2015, pp. 103-108, ISSN 0143-8166, https://doi.org/10.1016/j.optlaseng.2015.05.007 (Year: 2015).*
(Continued)

*Primary Examiner* — Md M Rahman
(74) *Attorney, Agent, or Firm* — David T. Millers

(57) ABSTRACT

An optical detector for detecting gas and suspended matter therein includes a test chamber, at least one light source, a sensing object, a test optical sensor and a processor. The test chamber accommodates a gas to be analyzed. The at least one light source emits an incident light that enters the test chamber. The sensing object is exposed to gas in the test chamber, receives the incident light, and reflects or transmits a portion of the incident light to form a test light. The test optical sensor receives the test light and generates a detected spectral signal. The processor receives the detected spectral signal and calculates a detection result according to the detected spectral signal.

19 Claims, 14 Drawing Sheets

(51) Int. Cl.
*G01N 21/77* (2006.01)
*G01N 21/78* (2006.01)

(58) Field of Classification Search
CPC ........... G01N 21/3504; G01N 33/0006; G01N 33/0026; G01N 29/30; G01N 29/326; G01N 2201/0662; G01N 21/783; G01N 2021/7773; G01N 2021/7783
USPC .......................................................... 356/319
See application file for complete search history.

(56) References Cited

U.S. PATENT DOCUMENTS

| | | | | |
|---|---|---|---|---|
| 6,426,703 | B1 | 7/2002 | Johnston et al. | |
| 7,233,396 | B1 | 6/2007 | Hall et al. | |
| 2004/0252307 | A1 | 12/2004 | Arno | |
| 2005/0121614 | A1 | 6/2005 | Stuttard | |
| 2006/0012794 | A1 | 1/2006 | Arno | |
| 2016/0327533 | A1 | 11/2016 | Jin et al. | |
| 2019/0018255 | A1* | 1/2019 | Qin | G02B 27/283 |

OTHER PUBLICATIONS

Phage-Based Structural Color Sensors and Their Pattern Recognition Sensing System, Ju Hun Lee, Benson Fan, Tuan D. Samdin, David A. Monteiro, Malav S. Desai, Olivia Scheideler, Hyo-Eon Jin, Soyoun Kim, and Seung-Wuk Lee, ACS Nano 2017 11 (4), 3632-3641, DOI: 10.1021/acsnano.6b07942 (Year: 2017).*

* cited by examiner

OPTICAL DETECTOR FOR DETECTING GAS AND SUSPENDED MATTER

REFERENCE TO RELATED APPLICATIONS

This patent document is the U.S. national phase of PCT App. No. PCT/US21/14210, filed Jan. 20, 2021, which claims benefit of the earlier filing date of U.S. provisional Pat. App. No. 62/963,411, filed Jan. 20, 2020.

BACKGROUND

Field of the Invention

The present invention relates to optical detectors, and in particular, to optical detectors that detect gas and suspended matter therein.

Description of the related art

Gas detectors have been used to dynamically monitor environmental pollution, which is a common concern in everyday life, industry, academia and research circles. Three major technologies currently used in gas detectors include metal oxide semiconductor (MOS), infrared (IR), and electro chemistry. MOS refers to components made from metal-semiconductor oxide materials. Gas detectors using MOS technology generally detect surface adsorption or reactions generated by the interaction of a MOS device and a gas. MOS-based gas detectors can be mass-produced using micro electro mechanical systems (MEMS) processes and are often used for air quality detection. Gas detectors with IR detection generally rely on the absorption characteristics of specific gases at the specific wavelengths of infrared light. In particular, IR gas detectors generally measure the amount of IR absorption, which is proportional to the concentration of a gas that absorbed the infrared light. Gas detectors with IR detection may be used as miniature spectrometers for food identification or detection. Gas detectors using electro chemistry generally drive a chemical reaction that specifically occurs with a target gas and measures the generated electrical current, which is proportional to the gas concentration. Gas detectors using electro chemistry are often used for health and disease measurements.

Gas detectors using IR detection often need to measure the absorption characteristics of a gas sample at specific wavelengths of infrared light. To increase the amount of absorption and facilitate measurements, a gas detector may need a large gas sample or may need to reflect the infrared light many times through the gas to provide enough absorption of the infrared light by the gas to be accurately measured. However, reflections absorb light, and IR detectors may require large gas samples and high quality reflectors, increasing the cost of reflecting materials, the volume of the gas chamber, and the time of detection used in the gas detector.

Additional factors of concerns for gas detectors that may affect the detection results include: the presence of other gases that are not targeted for detection, the humidity of the external environment, the temperature of the external environment, the temperature of the gas detector, air movement in the external environment, and the time used for the detection. These factors or concerns may cause the gas detectors to have the following problems: (1) the detection accuracy may be greatly affected by external temperature and humidity; (2) the gas composition resolution may be poor; (3) a gas detector may require a long time after startup to stabilize for accurate detection; and (4) the gas detector may consume a large amount of electricity for long-time use. A new type of gas detector is desired to solve the problems found in prior gas detectors.

SUMMARY

An optical detector for detecting gas and suspended matter therein can provide stable detection using a single reflection from (or transmission through) a reflector (or transmitter/absorber) having optical characteristics that depend on components or constituents of a gas sample adjacent to the reflector (or transmitter/absorber).

In one example of the present disclosure, an optical detector includes a test chamber, at least one light source, a reflective sensing object, a test optical sensor and a processor. The test chamber is configured to accommodate a gas sample that may contain one or more target components, e.g., specific gases or particles, to be detected. The at least one light source is coupled to the test chamber and configured to emit an incident light into the test chamber. The at least one light source may be configured to emit the incident light with specific spectrum. The reflective sensing object may be a reflector that changes its reflective properties when the one or more target components are present in the gas sample in the test chamber. The reflective sensing object may be disposed in the test chamber and positioned to receive the incident light and reflect the incident light to form a test reflected light. The test optical sensor receives the test reflected light and generate a detected spectral signal. The processor is coupled to the test optical sensor, receives the detected spectral signal, and calculates a detection result according to the detected spectral signal.

The optical detector may further include a reference chamber, a reference object, and a reference optical sensor in a configuration that is symmetrical with the configuration of the test chamber, the sensing object, and the test optical sensor. The at least one light source is also coupled to the reference chamber and is configured to emit the incident light into the test chamber and the reference chamber. The reference chamber may accommodate the same gas being sampled, and the reference object is disposed in the reference chamber to receive the incident light and reflect the incident light to form a reference reflected light. The reference optical sensor receives and detects the reference reflected light to generate a reference spectral signal. Symmetry of the test and reference elements may cause differences between the reference spectral signal and the detected spectral signal to be the results in differences between reflections from the sensing object and reflections from the reference object. The processor is also coupled to the reference optical sensor, receives the detected spectral signal and the reference spectral signal, and calculates a calibrated result according to the detected spectral signal and the reference spectral signal.

The path length of the incident light reaching the reflective sensing object may be the same as the path length of the incident light reaching the reference object, and the path length of the test reflected light reaching the test optical sensor may be the same as the path length of the reference reflected light reaching the reference optical sensor.

The optical detector may further include at least one light splitter lens located among the test chamber, the reference chamber and one of at least one light source. Each one of the at least one light splitter lens is configured to split the incident light from one of the at least one light source to the test chamber and the reference chamber.

The reference object may be configured to maintain low discoloration under various temperatures and humidity conditions and may include ceramic, aluminum oxide or zirconia.

The optical detector may further include a first protective glass, which is between the test chamber and the test optical sensor, and a second protective glass, which is between the reference chamber and the reference optical sensor. The first protective glass and the second protective glass may be configured to isolate the test optical sensor and the reference optical sensor from the test chamber and the reference chamber to protect the test optical sensor and the reference optical sensor from the pollution in or other constituents of the gas sample.

The optical detector may further include a temperature and humidity detector coupled to the processor and configured to detect the temperature and the humidity of the gas sample, and to generate a temperature and humidity result. The processor can then calculate the calibrated result according to the detected spectral signal, the reference spectral signal, and the temperature and humidity result.

When the reflective sensing object contacts the gas sample (including at least one target constituent to be detected), the reflective sensing object changes its structure according to the kinds of the at least one target constituent and the concentration of the at least one target gas. For example, the reflective sensing object may be an opaque object including at least one of a DNA modified phage and a DNA unmodified phage that reacts to the at least one target constituent. Therefore, the sensing object reflects the incident light to form the test reflected light with a spectrum corresponding to the presence or concentration of the at least one target constituent in the gas sample.

In another example of the present disclosure, an optical detector for detecting gas and suspended matter therein includes a gas chamber, a light source, a transmissive sensing object, a test optical sensor and a processor. The gas chamber is configured to accommodate a sample of a gas to be analyzed. The light source is coupled to the gas chamber and is configured for emitting an incident light into the gas chamber. The transmissive sensing object is disposed in the gas chamber, and the transmissive sensing object senses one or more target constituent of the gas sample to change a light penetrative or absorption property, e.g., opacity, of the transmissive sensing object. The transmissive sensing object may be configured to receive the incident light and the incident light penetrates or passes through the transmissive sensing object to form a test penetrating light. The test optical sensor is configured to receive and detect the test penetrating light to generate a detected spectral signal. The processor is coupled to the test optical sensor, and the processor is configured to receive the detected spectral signal to calculate a detection result according to the detected spectral signal.

The optical detector may further include a reference object and a reference optical sensor, which may be arranged symmetrically with the sensing object and the test optical sensor. The reference object may include a light transmissive object and is disposed in the gas chamber and configured to receive the incident light and form a reference penetrating light. The reference optical sensor is configured to receive and detect the reference penetrating light to obtain a reference spectral signal. The processor is also coupled to the reference optical sensor, receives the reference spectral signal, and calculates a calibrated result according to the detected spectral signal and the reference spectral signal.

The path length of the incident light reaching the transmissive sensing object may be the same as the path length of the incident light reaching the reference object, and the path length of the test penetrating light reaching the test optical sensor may be the same as the path length of the reference penetrating light reaching the reference optical sensor.

The optical detector may further include a first protective glass, which is between the transmissive sensing object and the test optical sensor, and a second protective glass, which is between the reference object and the reference optical sensor. The first protective glass and the second protective glass may isolate the gas chamber from the test optical sensor and the reference optical sensor to protect the test optical sensor and the reference optical sensor from the gas pollution.

The optical detector may further include a temperature and humidity detector coupled to the processor. The temperature and humidity detector detects the temperature and the humidity of the gas sample, and to generate a temperature and humidity result. The processor calculates the calibrated result according to the detected spectral signal, the reference spectral signal, and the temperature and humidity result.

When the transmissive sensing object contacts the gas sample (including at least one component to be detected), the transmissive sensing object changes its structure according to the kinds of the at least one gas component and the concentration of the at least one component. Therefore, the incident light penetrates the transmissive sensing object to form the test penetrating light with a spectrum corresponding to the kinds and concentrations of the at least one component. For example, the transmissive sensing object may be the light transmissive object that includes at least one of a DNA modified phage and a DNA unmodified phage.

Compared with the prior art, examples of the optical detectors disclosed herein may have the following advantages: (1) the optical detector has built-in calibration for various environmental factors (such as temperature and humidity), the temperature of the optical detector, and the emissions from the light source; (2) the built-in calibration allows use of a light source such as an LED without need of a stabilization or warm-up time after opening; (3) the optical detector has detection specificity to avoid the influence of other non-detected gases, so it has high gas composition resolution; (4) the optical detector may use a reflective or transmissive configuration; (5) the gas detector does not require a gas chamber with a large enough volume for multiple reflections, allowing the optical detector to be miniaturized; and (6) the optical detector can detect accurate detection results without multiple reflections, thereby shortening the detection time and reducing the power consumption.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

The following detailed description and discussion describes specific examples and with reference to the accompanying figures. It is noted that the examples are merely representative, and the specific methods, devices, conditions, materials, and the like are not intended to limit the invention to the specific examples. Moreover, the devices in the figures are only used to express their relative positions and may not be drawn in their actual proportions.

Figure 1:
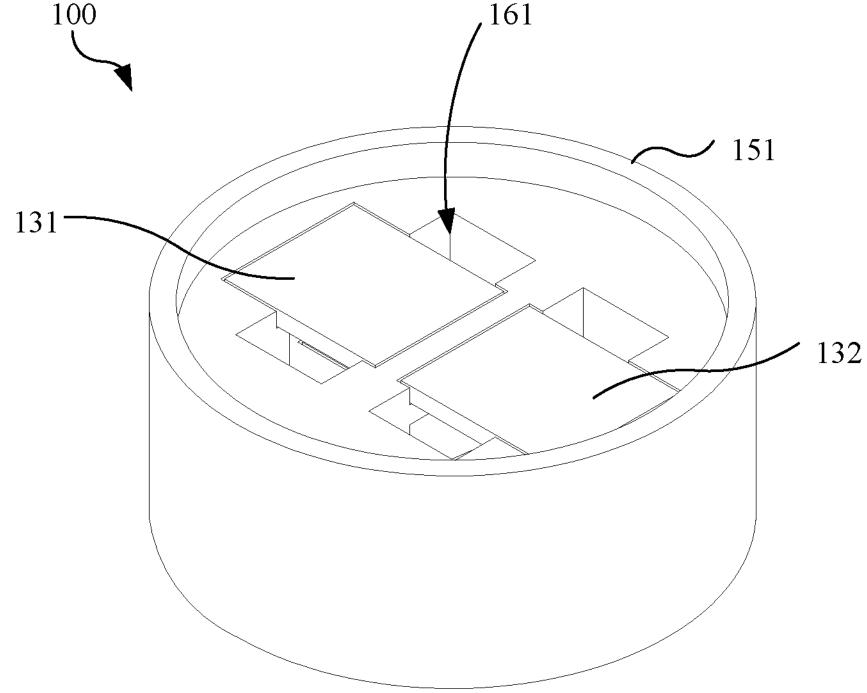
FIG. 1 is a perspective view an optical detector according to an example of the present disclosure using a reflective sensing object.

FIG. 1 shows an optical detector 100 in accordance with a first example of the present disclosure. Detector 100 may be used to detect one or more target gas or suspended matter that may be constituents of a gas sample. In order to clearly explain its principle and structure, the following primarily describes examples that detect a target gas or gases. However, it should be understood that the optical detectors disclosed can also be used to detect suspended matter, e.g., particles suspended in a gas sample.

Figure 2:
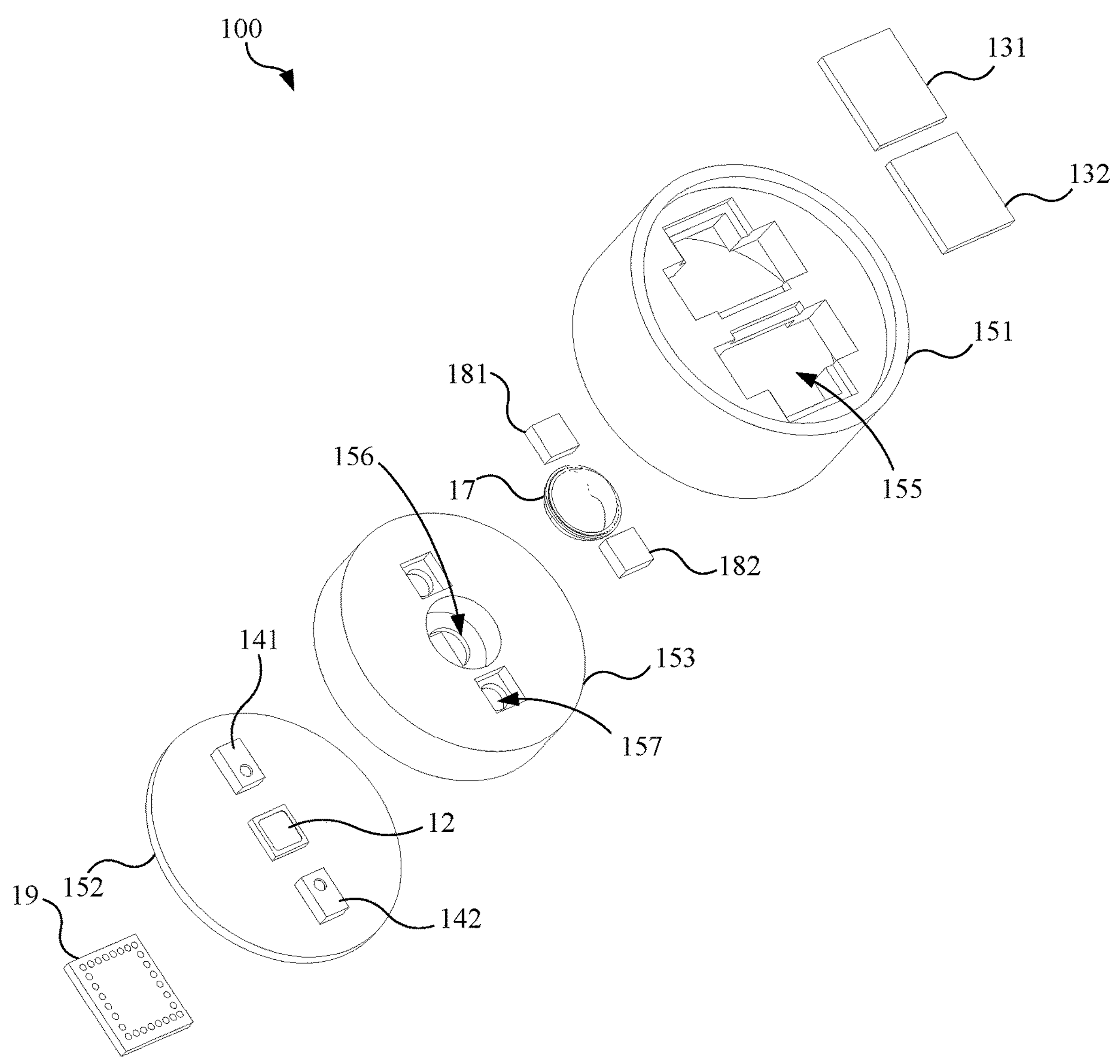
FIG. 2 is an exploded view of the optical detector of FIG. 1.
Figure 3:
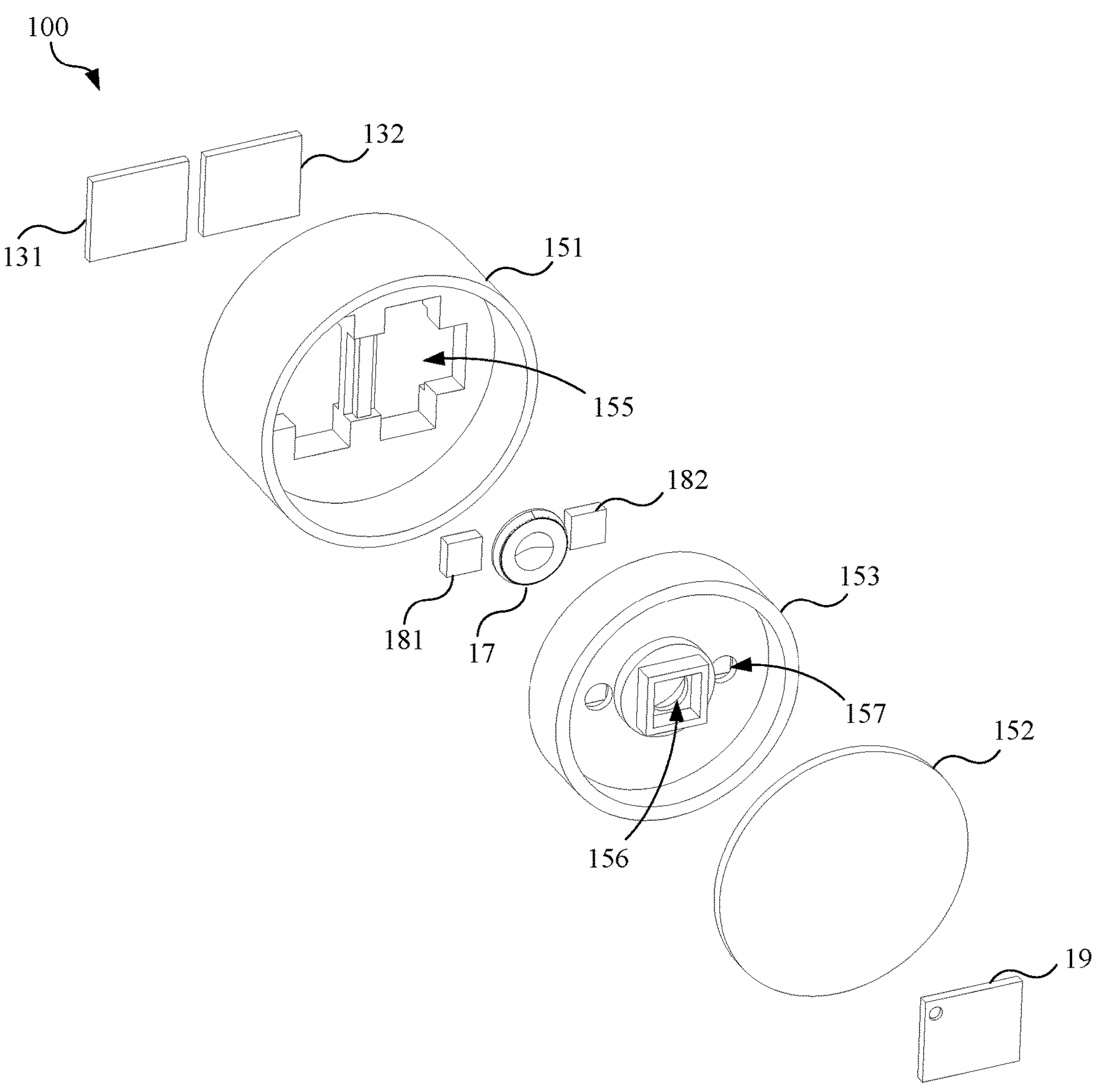
FIG. 3 is an exploded view showing another side of components of the optical detector of FIG. 1.
Figure 4:
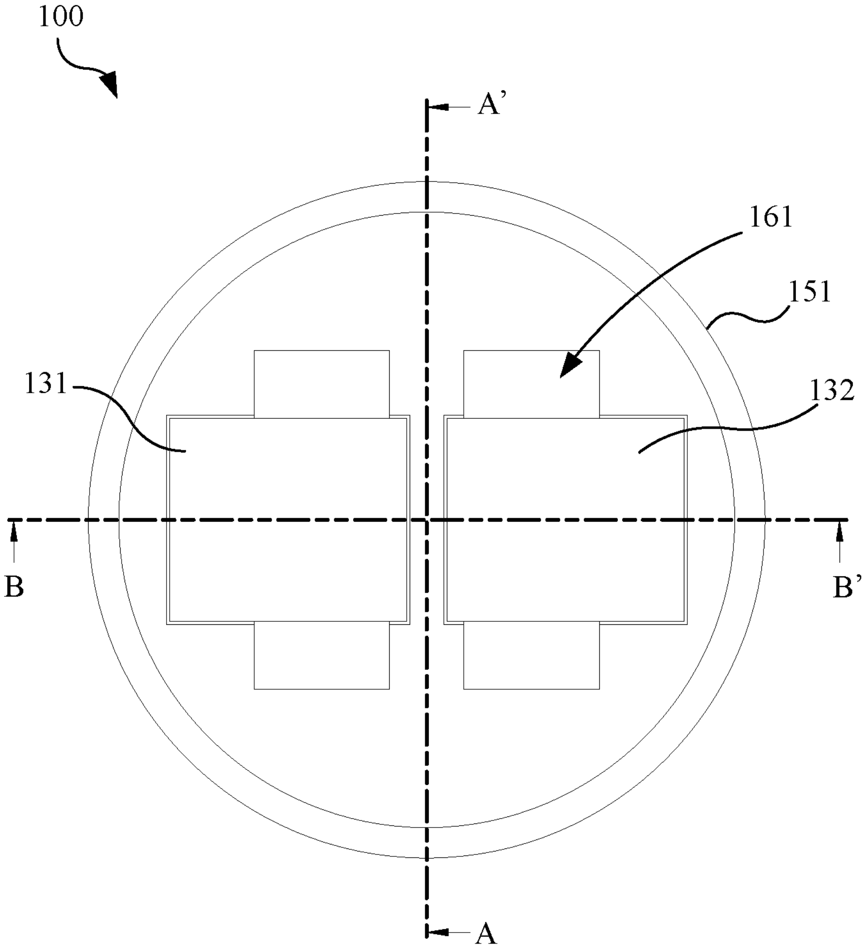
FIG. 4 is a schematic diagram showing an A-A' section line and a B-B' section line of the optical detector of FIG. 1.
Figures 5A, 5B:
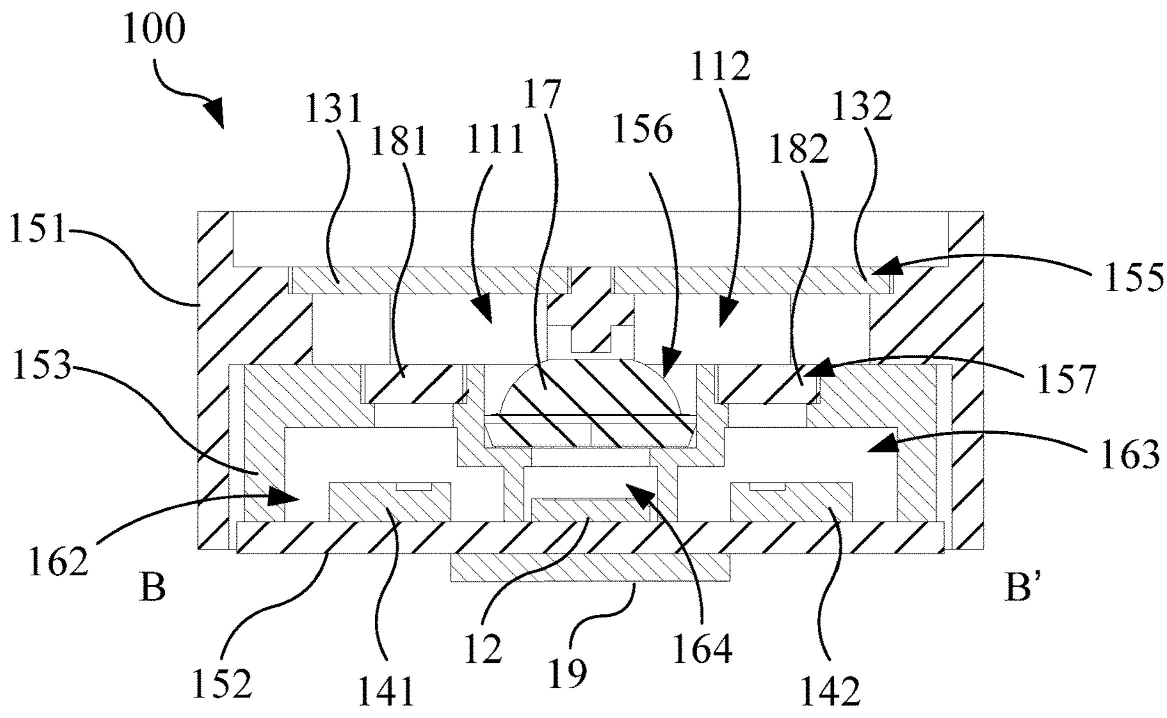
FIG. 5A is a sectional view along the A-A' section line of FIG. 4.
FIG. 5B is a sectional view along the B-B' section line of FIG. 4.

FIG. 1 shows a perspective view of the optical detector 100 according to a first example of the present disclosure. FIGS. 2 and 3 are exploded views showing different sides of components of the optical detector 100 of FIG. 1. FIG. 4 is a schematic diagram showing a section lines A-A' and B-B' of the optical detector 100 of FIG. 1, and FIGS. 5A and 5B show cross-sectional views respectively along section lines A-A' and B-B' of the optical detector 100. As shown in FIG. 1 to FIG. 5B, the optical detector 100 includes a test chamber 111, a light source 12, a reflective sensing object 131, a test optical sensor 141, and a processor 19. The test chamber 111 is configured to accommodate a gas sample, which may be drawn from an environment surrounding optical detector 100. The light source 12 is coupled to the test chamber 111 and is configured to emit an incident light into the test chamber 111. The reflective sensing object 131 is disposed in or adjacent to the test chamber 111 and is exposed to the gas sample in test chamber 111. The reflective sensing object 131 senses a gas to be detected, sometimes referred to as a target gas, by changing a reflective property of the reflective sensing object 131 when the target gas is present. In general, the sensing object may be sensitive to multiple different target gases, and the change in the reflective property of the sensing object 132 may differ depending on which of the target gases are present and the concentrations of the target gases. The reflective sensing object 131 is further positioned or configured to receive the incident light and reflect the incident light to form a test reflected light. The test optical sensor 141 is configured to receive the test reflected light to generate a detected spectral signal. The processor 19 is coupled to the test optical sensor 141, receives the detected spectral signal, and calculates a detection result according to the detected spectral signal. In particular, the processor 19 executes software or firmware to analyze the detected spectral signal (and other data input as described further below) to generate the detection result, e.g., an indication of the presences or concentration of one or more target gas or particle in a gas sample.

The optical detector 100 uses the known or calibrated characteristics of the reflective sensing object 131, e.g., the predetermined change expected in reflectivity of the reflective sensing object 130 when a target component is present in a specified concentration, to determine the detection result. When the reflective sensing object 131 contacts the gas sample (including at least one target constituent), the reflective sensing object 131 changes its structure according to the kinds of the constituent and the concentration of the constituent. Therefore, the reflective sensing object 131 reflects and may alter the incident light to form the test reflected light with a spectral distribution that depends on the change in the reflective characteristics of sensing object 131. Compared with a gas detector using conventional IR detection, the optical detector 100 can detect one or more gas constituents without requiring multiple reflections, so the optical detector 100 can reduce the cost of reflecting materials, the volume of the gas chamber, and the time of detection.

Characteristics of the external environment (such as temperature and humidity) may shift or alter the detected spectral signal, so that correction may be needed to avoid an environmental error in the detection result. In order to avoid an environmental error in the detection result, the optical detector 100 can further include a reference chamber 112, a reference object 132, and a reference optical sensor 142 arranged symmetrically with the test chamber 111, the reflective sensing object 131, the test optical sensor 141. The reference chamber 112 is configured to accommodate some of the gas to be analyzed, i.e., gas with the same compositions the gas sample in the test chamber 111. The reference object 132 is disposed in or adjacent to the reference chamber 112, and the reference object 132 is configured to receive the incident light and reflect the incident light to form a reference reflected light. The reference optical sensor 142 is configured to receive and detect the reference reflected light to generate a reference spectral signal. The light source 12 may be coupled to the test chamber 111 and the reference chamber 112 and may emit the incident light into both the test chamber 111 and the reference chamber 112. The processor 19 is further coupled to the reference optical sensor 142, receives the detected spectral signal and the reference spectral signal, and uses the detected spectral signal and the reference spectral signal to calculate a calibrated result.

The reference object 132 may contain a material that maintains low discoloration under various temperatures and humidity conditions, so that the reflectance of the reference object 132 is largely unaffected by temperature and humidity of the environment. In practice, the reference object 132 may include a ceramic, aluminum oxide, or zirconia, which have low responses to changes in temperature and humidity. After the incident light and the reference reflected light contacts the gas to be analyzed in the reference chamber 112, the reference optical sensor 142 receives and generates the reference spectral signal. Thus, the reference spectral signal represents a baseline spectral distribution of light from the light source 12 after the effects of passing through the gas to be analyzed at the current temperature and humidity of the environment and the temperature of the detector 100, and therefore the reference spectral signal provides a blank calibration signal without any changes in the characteristics in a reflector. When the processor 19 calculates the detection result using the test spectral signal and the reference spectral signal together, the processor 19 calculates a calibrated result, which accounts for the influence of temperature and humidity.

In order to fasten the above components, the optical detector 100 further includes an object holder 151, a sensor holder 152 and a sensor protective cover 153. As shown in FIG. 2 to FIG. 5B, the object holder 151 holds the reflective sensing object 131 and the reference object 132, and the sensor holder 152 holds the light source 12, the test optical sensor 141, and the reference optical sensor 142. The sensor protective cover 153 is between the object holder 151 and the sensor holder 152 and is coupled to them respectively. When the object holder 151, the sensor holder 152 and the sensor protective cover 153 are assembled together, the test chamber 111 and the reference chamber 112 are formed between the object holder 151 and the sensor protective cover 153. Spaces 162, 163, and 164 are formed between the sensor protective cover 153 and the sensor holder 152 and respectively contain test sensor 141, reference sensor 142, and light source 12. In the illustrated configuration, the test chamber 111 is isolated from the reference chamber 112, and the test sensor accommodated space 162, the reference sensor accommodated space 163, and the light source accommodated space 164 are isolated from each other. In addition, the sensor protective cover 153 is configured to isolate the test chamber 111 from the test sensor accommodated space 162, and also configured to isolate the reference chamber 112 from the reference sensor accommodated space 163 to prevent the gas to be analyzed from entering the test sensor accommodated space 162 and the reference sensor accommodated space 163. The gas to be analyzed may contain constituents that affect or damage the test optical sensor 141 and the reference optical sensor 142, and isolation of spaces 162 and 163 avoids factors that could affect sensing accuracy.

As shown in FIG. 1 to FIG. 5B, the object holder 151 has two object housing slots 155 (one holds the reflective sensing object 131 and the other holds the reference object 132). When the reflective sensing object 131 and the reference object 132 are fastened in the object housing slots 155, two openings 161 are formed between the reflective sensing object 131 and the object holder 151, and two openings 161 are formed between the reference object 132 and the object holder 151 (as shown in FIG. 1). The openings 161 are configured to communicate the test chamber 111 with the external environment and communicate the reference chamber 112 with the external environment for allowing the gas to be analyzed to freely enter and exit detector 100.

In order to evenly split the incident light emitted from light source 12 entering into two chambers (the test chamber 111 and the reference chamber 112), the optical detector 100 further includes a light splitter lens 17. Light splitter lens 17 may be an optical element such as a beam splitter with or without optical characteristics that focus or collimate split light beams. As shown in FIG. 2, the sensor protective cover 153 further includes a lens housing slot 156 which accommodates the light splitter lens 17. As shown in FIG. 5B, when the optical detector 100 is assembled, the light splitter lens 17 is directly above the light source 12, and is located among the test chamber 111, the reference chamber 112 and the light source accommodated space 164. The light splitter lens 17 is configured to split the incident light from the light source 12 to the test chamber 111 and the reference chamber 112. The light splitter lens 17, which is accommodated in the lens housing slot 156 of the sensor protective cover 153, abuts against the object holder 151, so that the test chamber 111, the reference chamber 112, and the light source accommodated space 164 are isolated from each other but can communicate light with each other by light.

In order to communicate the test chamber 111 with test sensor accommodated space 162 by light, and communicate the reference chamber 112 with the reference sensor accommodated space 163 by light, the optical detector 100 further includes a first protective glass 181 and a second protective glass 182. As shown in FIGS. 2 and 5B, the sensor protective cover 153 further includes two glass housing slots 157. Wherein, one glass housing slot is between the test chamber 111 and the test sensor accommodated space 162 and is configured to accommodate the first protective glass 181. The other one glass housing slot is between the reference chamber 112 and the reference sensor accommodated space 163 and is configured to accommodate the second protective glass 182. In order for the test optical sensor 141 to smoothly receive the test reflected light, the first protective glass 181 is on the light path of the test reflected light. For the same reason, in order for the reference optical sensor 142 to smoothly receive the reference reflected light, the second protective glass 182 is on the light path of the reference reflected light. Thus, the test chamber 111 can communicate with test sensor accommodated space 162 by light, and the reference chamber 112 can communicate with the reference sensor accommodated space 163 by light. The first protective glass 181 and the second protective glass 182 also isolate the test optical sensor 141 and the reference optical sensor 142 from the test chamber 111 and the reference chamber 112 to protect the test optical sensor 141 and the reference optical sensor 142 from the gas pollution.

In practice, the light source 12 may be a light-emitting diode (LED), and is configured to emit the incident light with a specific spectrum, e.g., a broad spectral power distribution or a spectral power distribution including light with wavelengths at which reflective sensing object 131 changes its optical characteristics, e.g., changes reflectivity, depending on the concentration of a target gas. IR based gas detectors use infrared light as the light source, and infrared light sources need time to warm-up and stabilize. The optical detector 100 does not require infrared light and may use an LED as the light source 12, so that the optical detector 100 can be used without the stabilization time and the warm-up time after activation. (The reference senor 142 also measures a spectral distribution indicating the spectrum of light from light source 12, which further reduces the need to precisely stabilized light source 12.) The sensor holder 152 can be a printed circuit board (PCB), and the processor 19 can be a central processing unit, a microcontroller unit or a computer which can be coupled to the test optical sensor 141 and reference optical sensor 142 through the sensor holder 152.

The optical detector 100 may be handled, fastened, or mounted for use through the object holder 151, the sensor holder 152, and the sensor protective cover 153. The disclosed detector 100 has the advantage that the path length of the incident light reaching the reflective sensing object 131 is the same as the path length of the incident light reaching the reference object 132 because of the symmetrical arrangement of sensing and corresponding reference components relative to light source 12. For the same reason, the path length of the test reflected light reaching the test optical sensor 141 is the same as the path length of the reference reflected light reaching the reference optical sensor 142.

Figure 6:
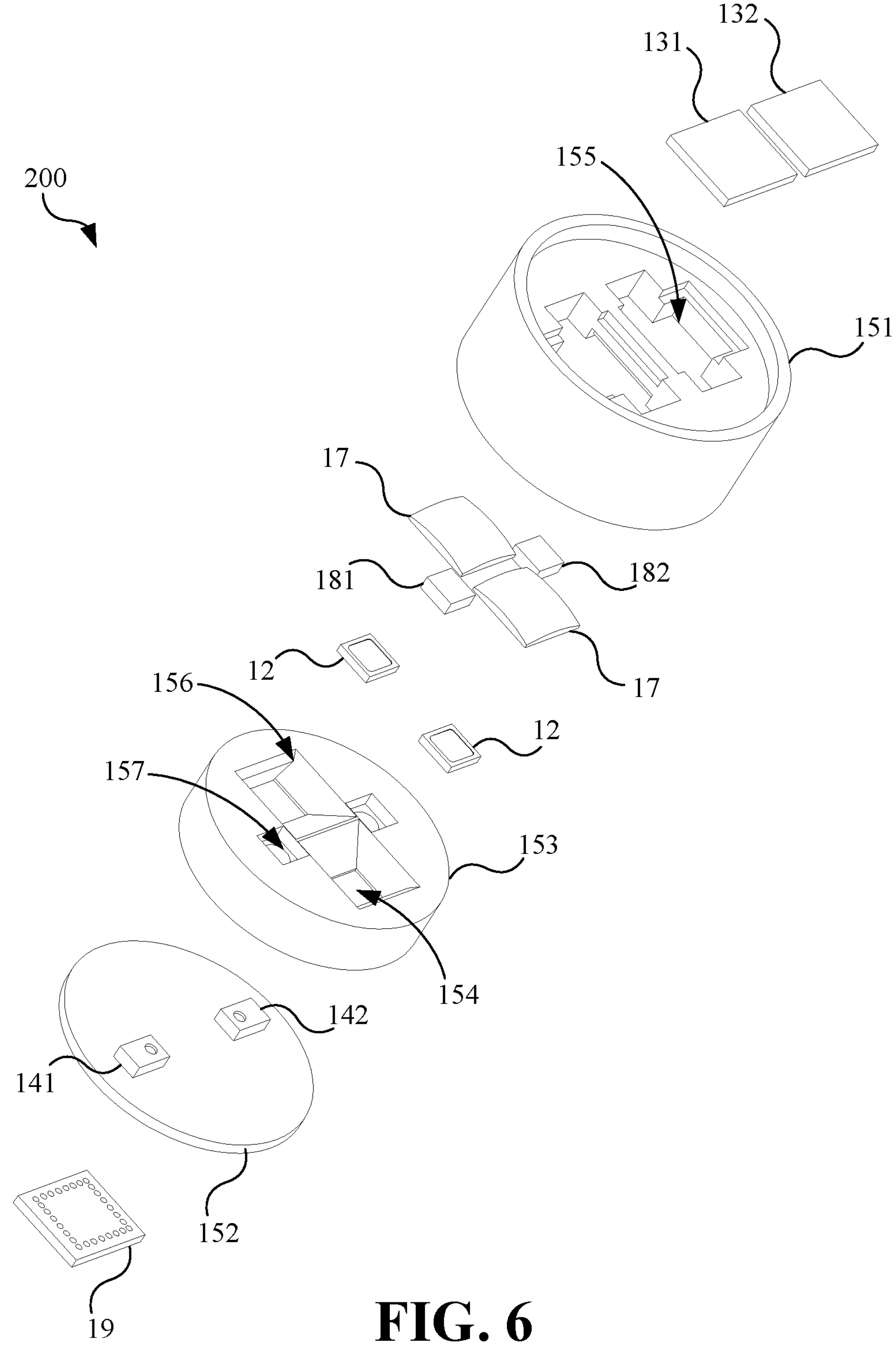
FIG. 6 is an exploded view showing an optical detector according to an example of the present disclosure using multiple light sources.
Figure 7:
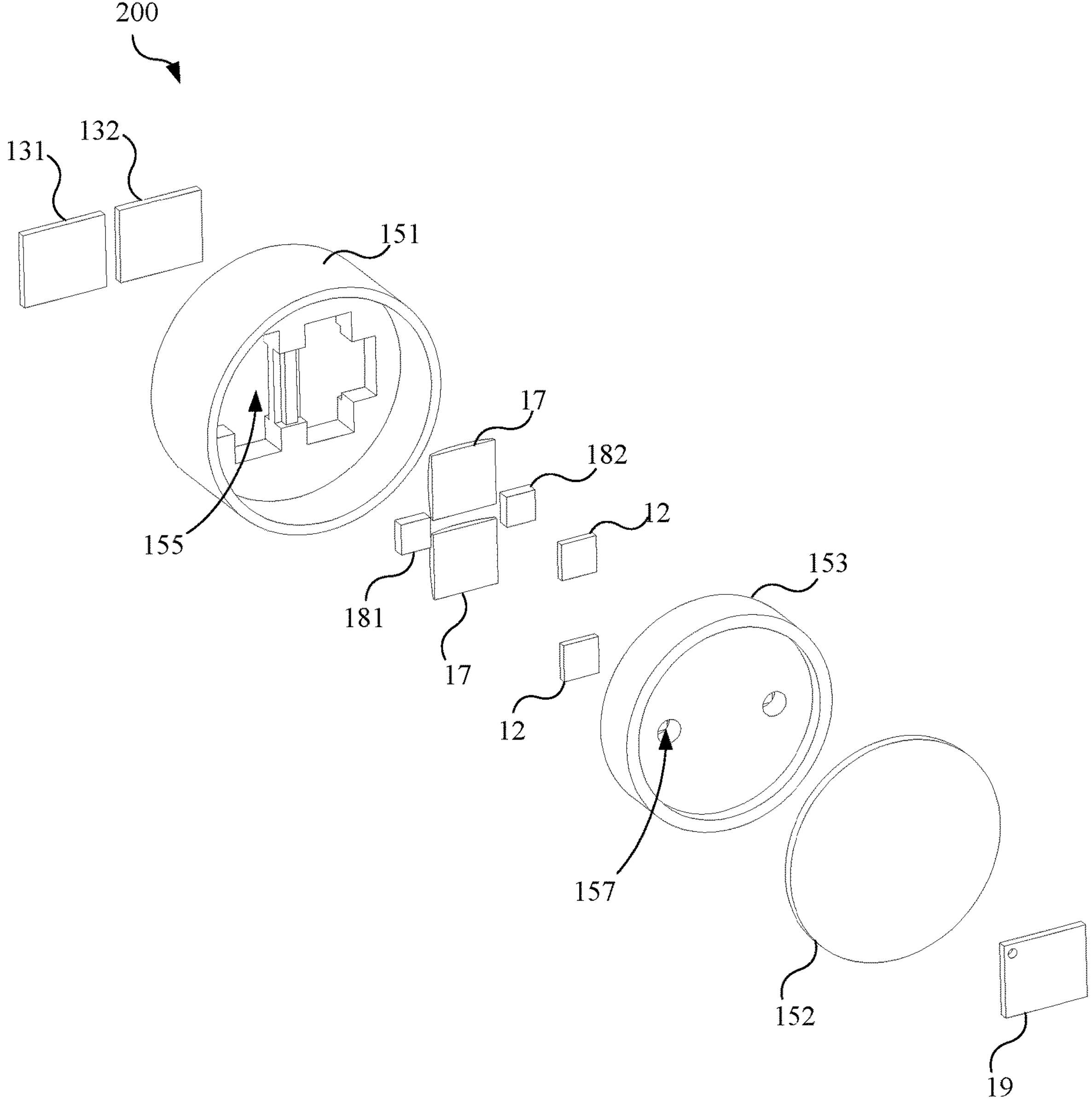
FIG. 7 is an exploded view showing another side view of the optical detector of FIG. 6.
Figure 8:
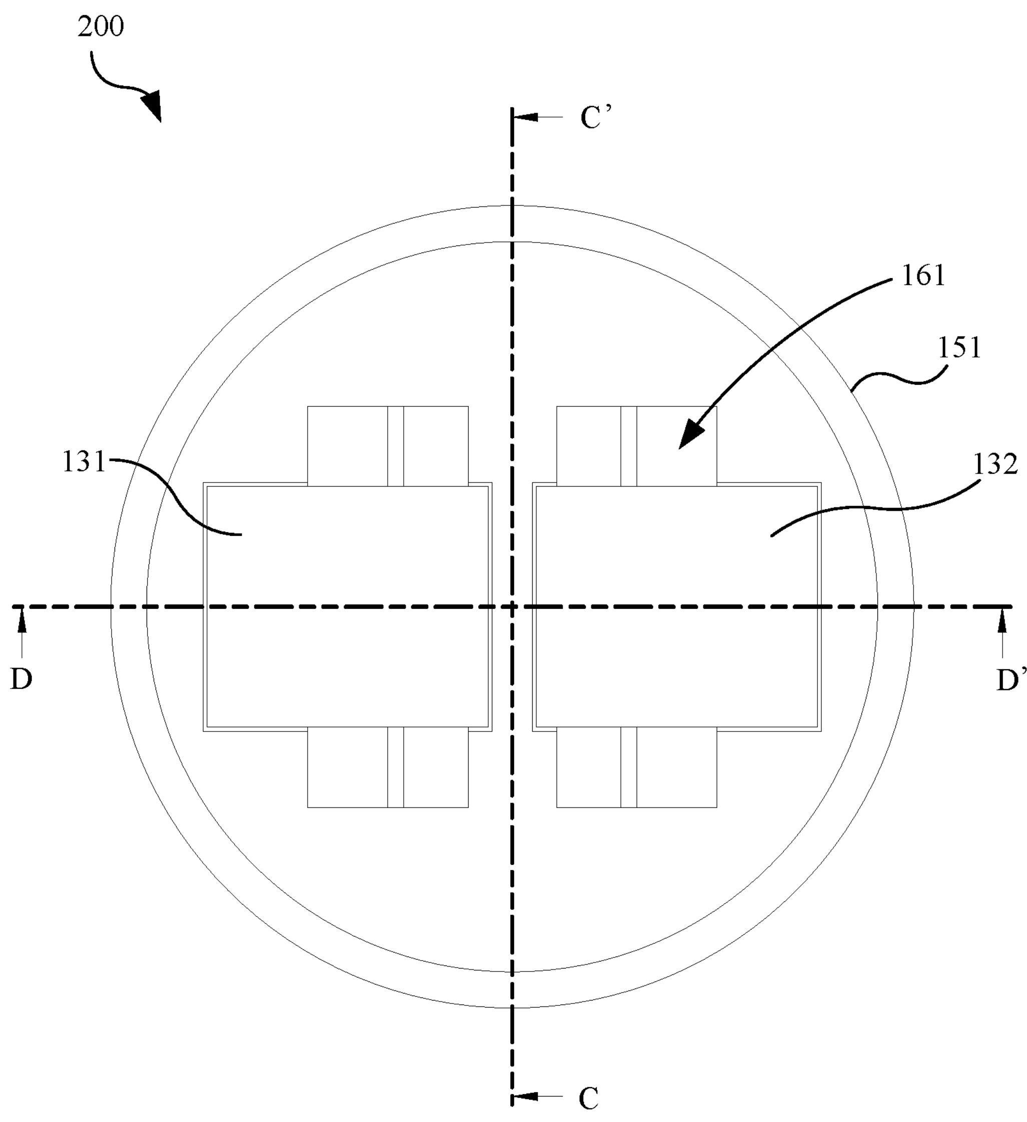
FIG. 8 is a schematic diagram showing a C-C' section line and a D-D' section line of the optical detector of FIG. 6.
Figure 9A:
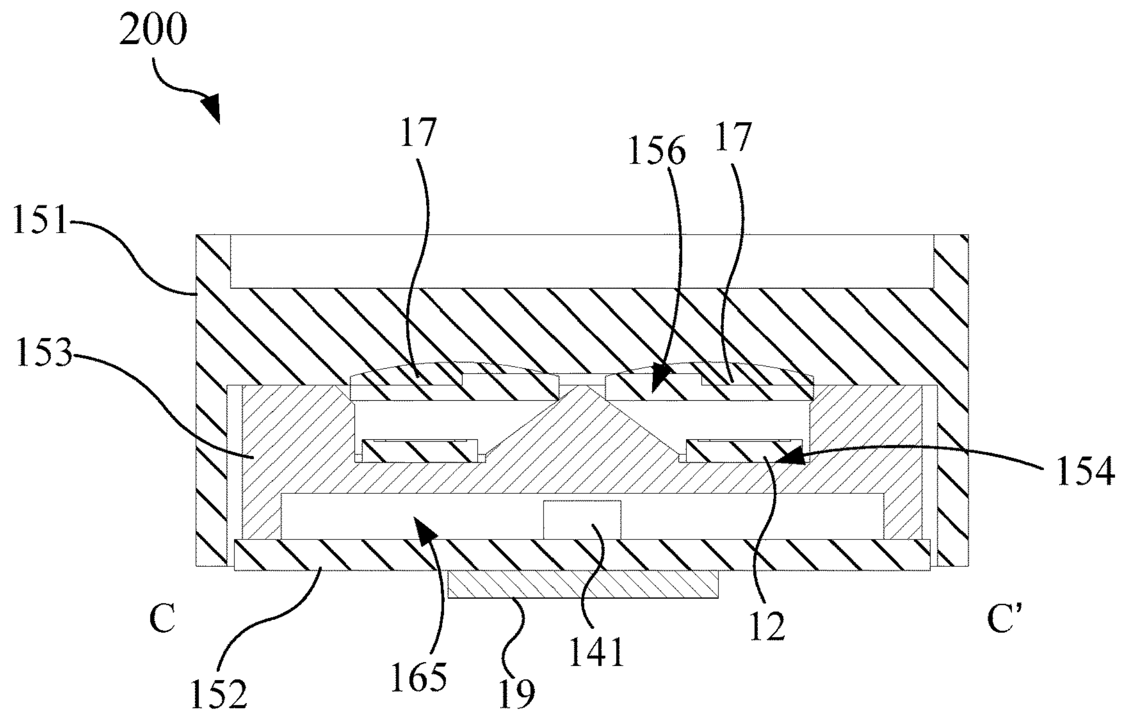
FIG. 9A is sectional view along the C-C' section line of the optical detector of FIG. 8.
Figure 9B:
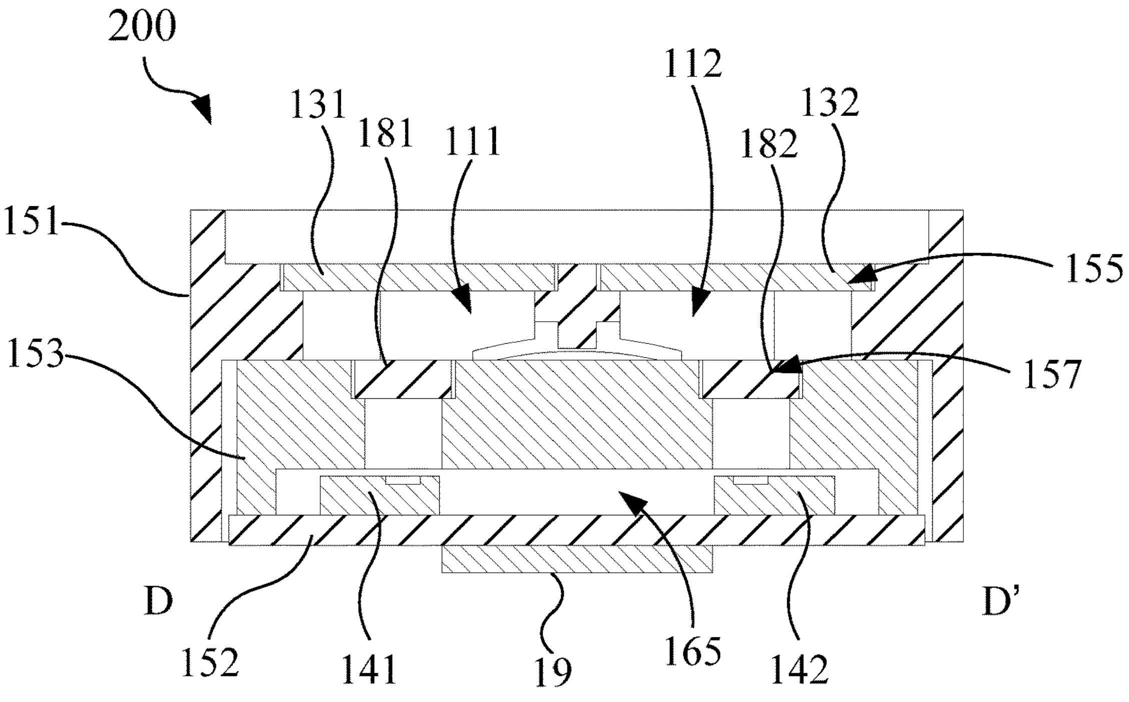
FIG. 9B is sectional view along the D-D' section line of the optical detector of FIG. 8.

Apart from the example detector 100 of FIG. 2 to FIG. 5B with only one light source 12, an optical detector can alternatively include more than one light source. FIG. 6 to FIG. 9B show an alternative example of detector 200 having multiple light sources 12. Light sources 12 may emit light having the same spectral power distribution or different spectral power distributions, e.g., different light sources 12 in optical detector 200 may emit light having spectral distributions peaked at different wavelengths. FIG. 6 is an exploded view showing the optical detector 200 according to another example of the present disclosure. FIG. 7 is an exploded view showing another side of the optical detector 200 of FIG. 6. FIG. 8 is a schematic diagram showing section lines C-C' and a D-D' of the optical detector 200 of FIG. 6. FIG. 9A is sectional view of the optical detector 200 along the section line C-C' of FIG. 8, and FIG. 9B is sectional view of the optical detector 200 along the section line D-D' of FIG. 8. Most of the components in optical detector 200 are the same as those of the optical detector 100, and discussion of those components is not be repeated below. As shown in FIG. 6 to FIG. 9B, the optical detector 200 particularly includes two light sources 12 and two light splitter lenses 17. The sensor protective cover 153 includes two light source housing slots 154, two lens housing slots 156, and two glass housing slots 157. One lens housing slot 156 is directly above one light source housing slot 154, and the lens housing slot 156 is larger than the light source housing slot 154 to form a trapezoidal structure. Each light splitter lens 17 is located among the light source housing slot 154, the test chamber 111, and the reference chamber 112, thus the incident lights emitted from the light sources 12 can be split smoothly into the test chamber 111 and the reference chamber 112. In practice, one side, which is near the periphery of the sensor protective cover 153, of the trapezoidal structure is vertical with the lens housing slot 156 and the light source housing slot 154 (as shown in FIG. 9A).

In optical detector 200, the test optical sensor 141 and the reference optical sensor 142 are fastened on the sensor holder 152, and are accommodated in a sensor accommodated space 165, which is formed between the sensor protective cover 153 and the sensor holder 152. It should be noted that the people skilled in this field can make changes for multiple light sources 12 according to the above teachings, or adjust the position of the components without hindering the execution of the above functions.

Both of the optical detectors 100 and 200 use reflective type sensing objects 131. The reflective sensing object 131 is an opaque and reflective and may include at least one of a DNA modified phage or a DNA unmodified phage. U.S. Pat. App. Pub. No. 2016/0312262, entitled "BIOMIMETIC VIRUS-BASED COLORIMETRIC SENSORS," which is hereby incorporated by reference in its entirety, describes how a colorimetric detection layer with fiber bundles self-assembled fiber bundles including a filamentous phage may be configured to undergo a color change upon interaction with an analyte, e.g., a target gas or particle, of interest. In particular, a fraction of the fiber bundles may undergo a change from a first conformation to a second conformation upon interaction with the analyte of interest, thereby undergoing a color change. Such techniques may be used in sensing object 132 such that the color change alters the reflective properties of reflective sensing object 132, particularly causing the spectral distribution of reflected light to differ from the spectral distribution of incident light. The reflective sensing object 131 may detect different gas components and their concentrations according to different DNA modified phages or DNA unmodified phages, or according to same DNA modified phage or DNA unmodified phage. More generally, sensing object 131 may use any color changing materials and is not limited to materials using phages.

Figure 10:
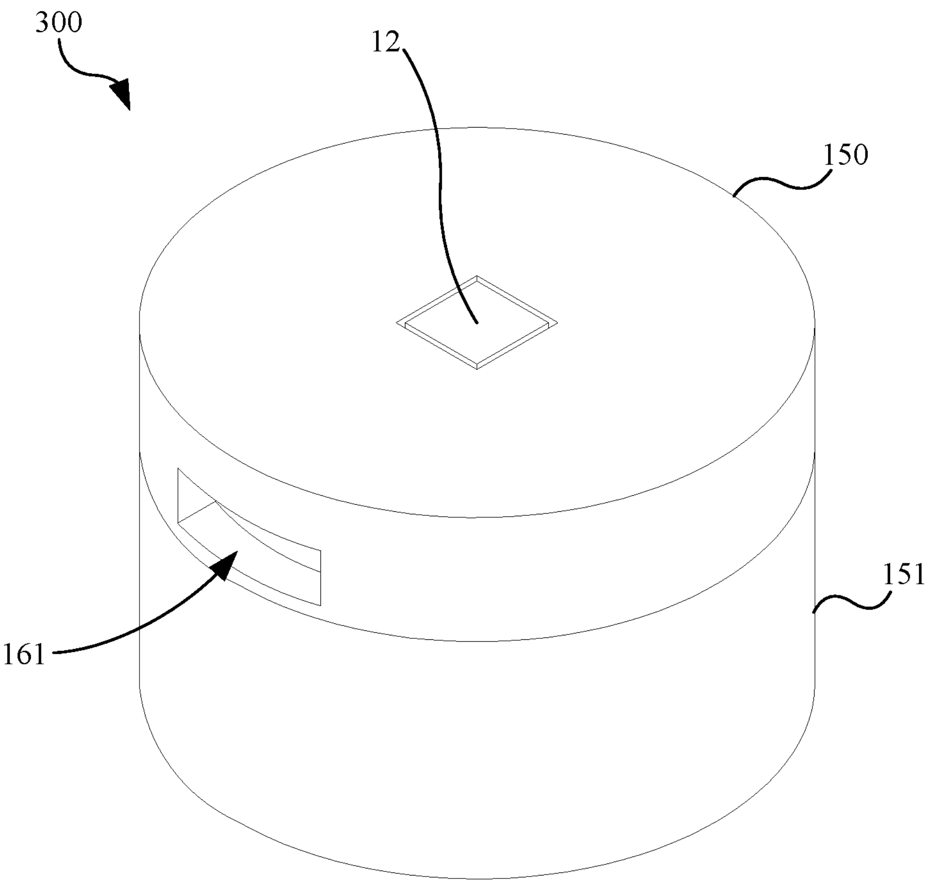
FIG. 10 is a perspective view of an optical detector according to an example of the present disclosure using a transmissive sensing object.
Figure 11:
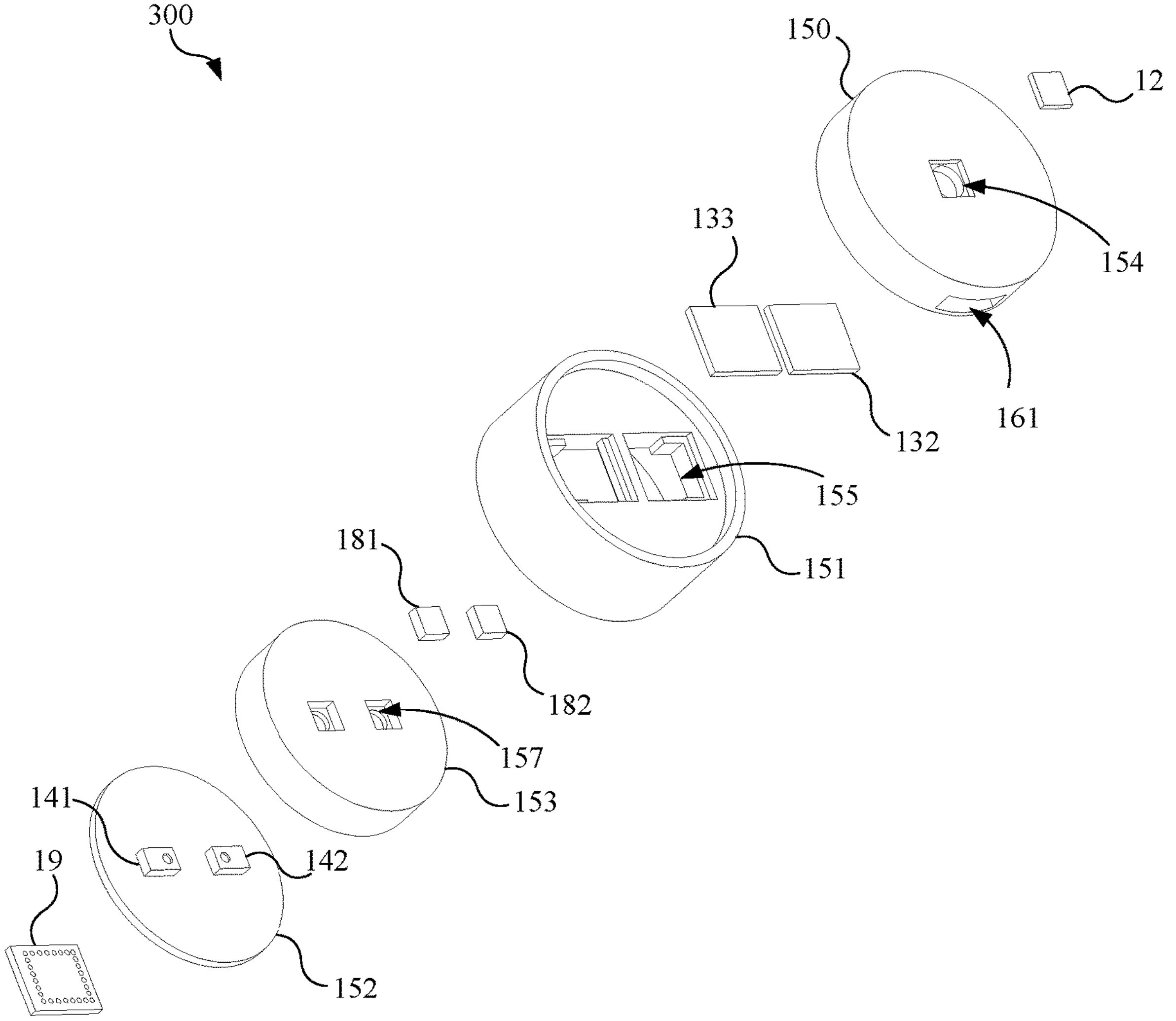
FIG. 11 is an exploded view of the optical detector of FIG. 10.
Figure 12:
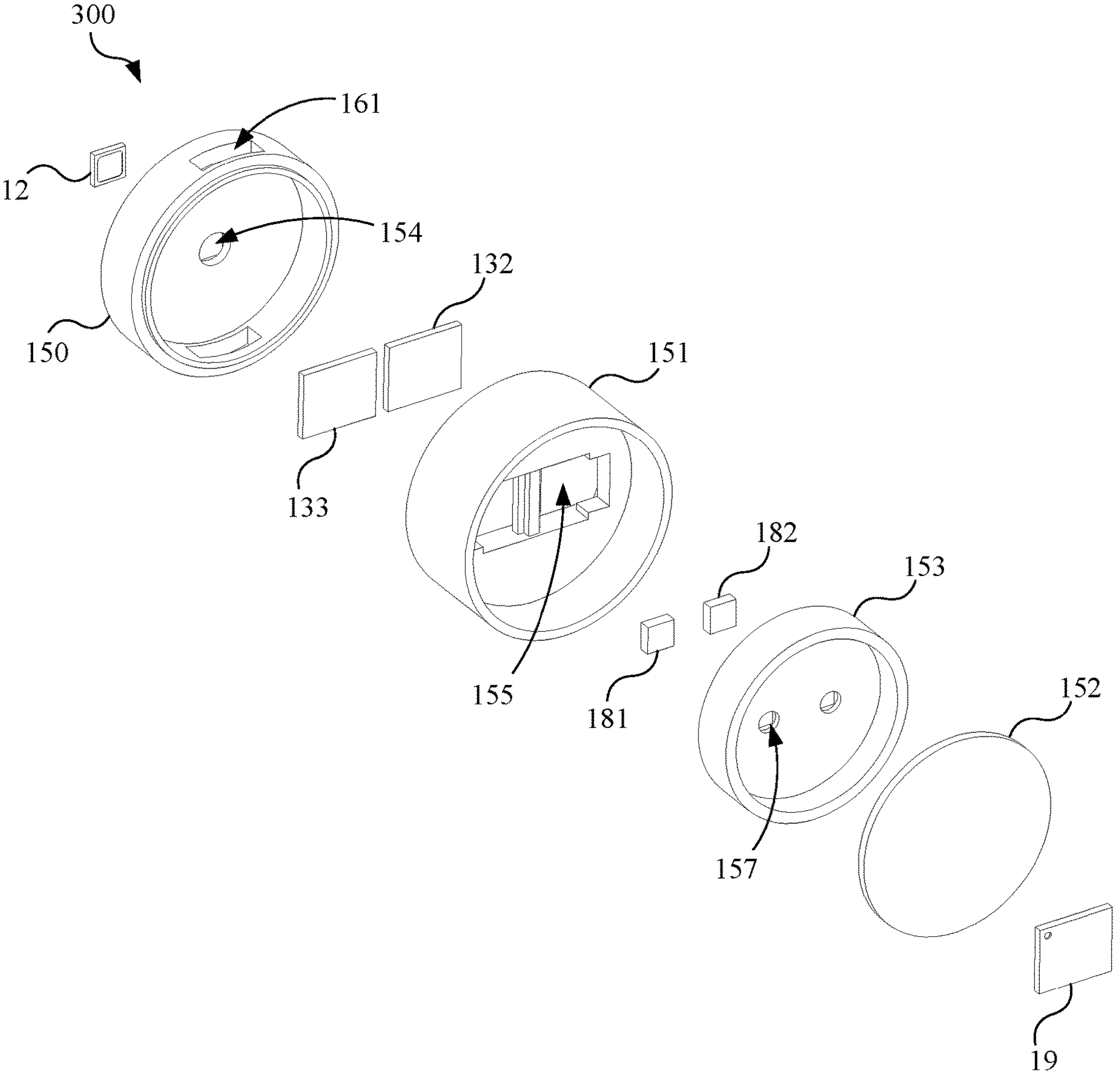
FIG. 12 is an exploded view showing another side view of the optical detector of FIG. 10.
Figure 13:
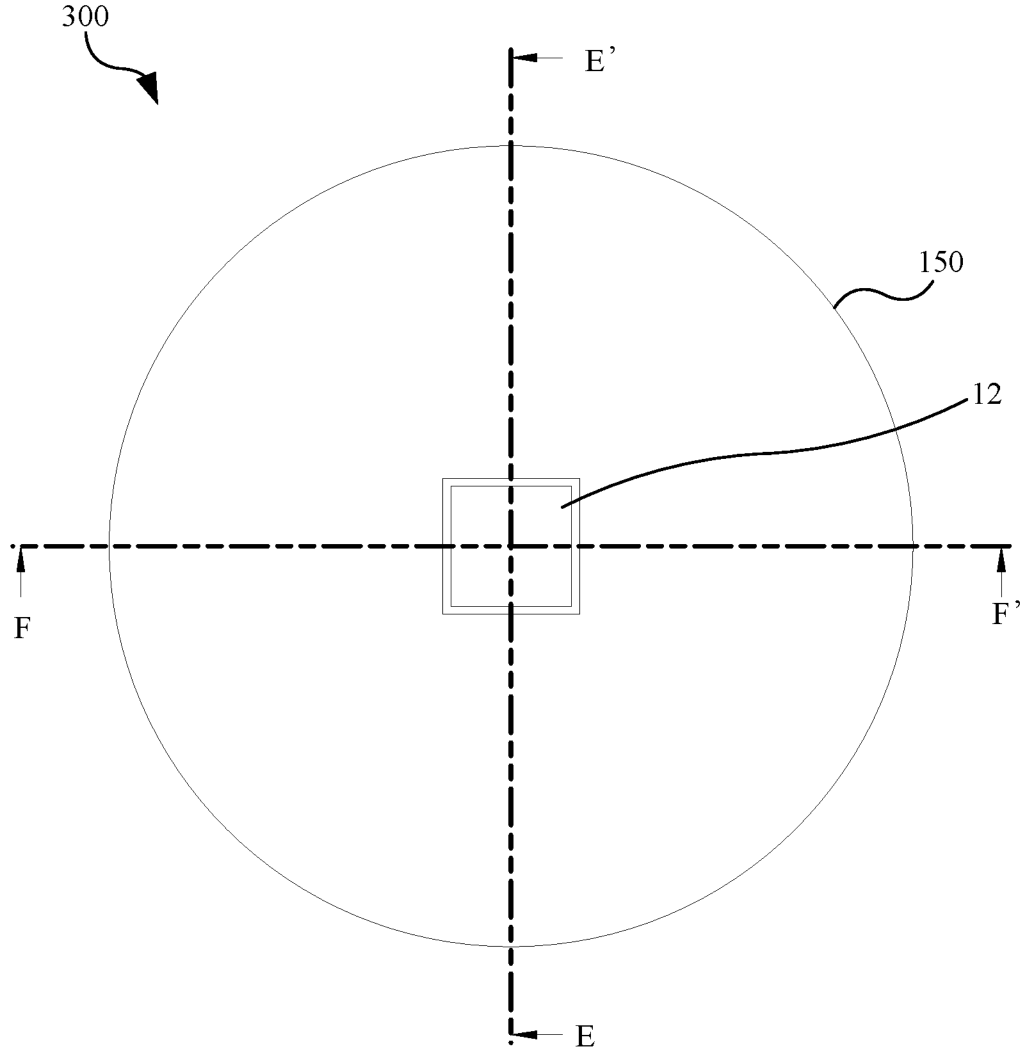
FIG. 13 is a schematic diagram showing an E-E' section line and a F-F' section line of the optical detector of FIG. 10.
Figure 14A:
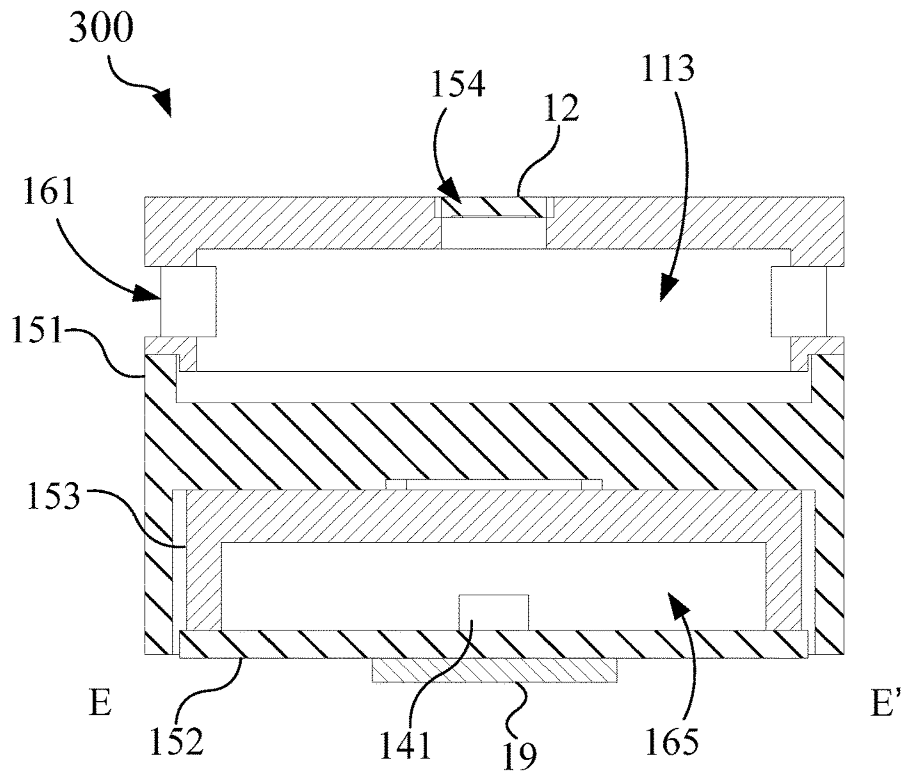
FIG. 14A is sectional view along the E-E' section line of the optical detector of FIG. 13.
Figure 14B:
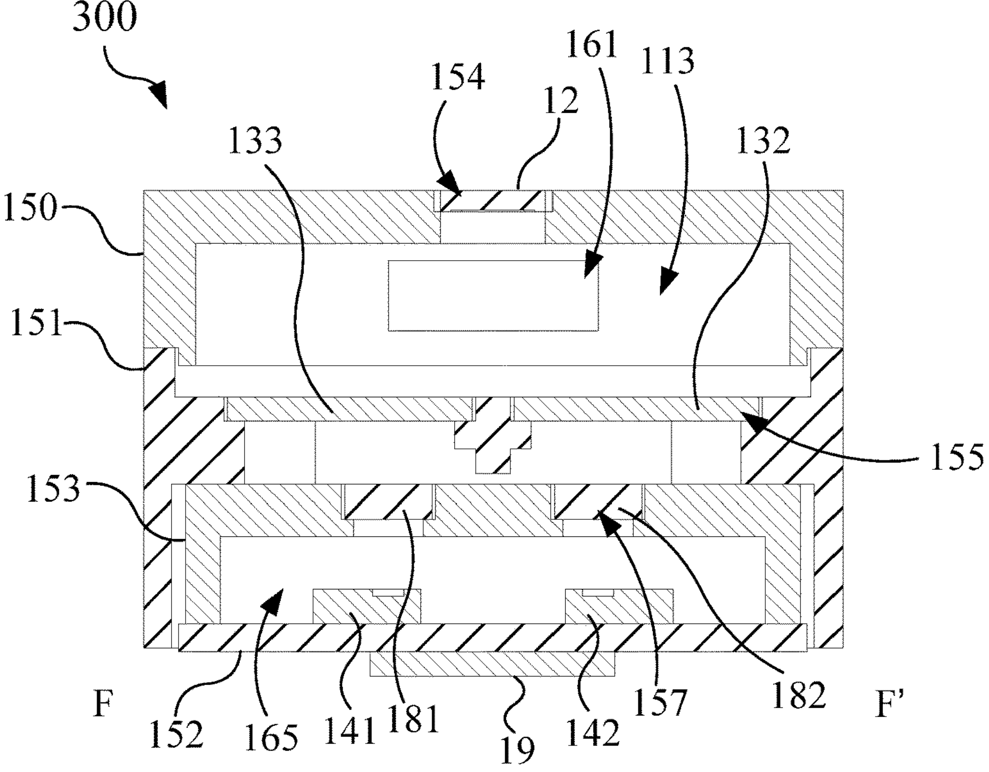
FIG. 14B is sectional view along the F-F' section line of the optical detector of FIG. 13.

Apart from the embodiment of the reflective type structure of the optical detectors 100 and 200, an optical detector in accordance with other examples of the present disclosure may use a penetrative or transmissive type structure for a sensing object. FIG. 10 to FIG. 14B particularly illustrate and example of an optical detector 300 using a penetrative or transmissive type structure for a sensing object. More specifically, FIG. 10 shows a perspective view of optical detector 300. FIGS. 11 and 12 are exploded views showing different sides of components of the optical detector 300 of FIG. 10. FIG. 13 is a schematic diagram showing section lines E-E' and F-F' of the optical detector 300 of FIG. 10. FIGS. 14A and 14B are cross-sectional views of the optical detector 300 respectively along the section lines E-E' and F-F' of FIG. 13. Most of the components of optical detector 300 are the same as corresponding components of optical detector 100 or 200 and complete description of the identical components are not repeated below.

As shown in FIG. 10 to FIG. 14B, the optical detector 300 includes a gas chamber 113, the light source 12, a transmissive sensing object 133, the test optical sensor 141 and the processor 19. The transmissive sensing object 133 senses a target constituent of the gas sample to be analyzed and changes the light penetrative properties of the transmissive sensing object 133. The transmissive sensing object 133 is positioned to receive the incident light, and the incident light passes through the transmissive sensing object 133 to form a test penetrating light. In particular, transmissive sensing object 133 may preferentially absorb particular wavelengths of the incident light, depending on the concentrations of one or more target constituent in the gas sample, to produce the test penetrating light. The test optical sensor 141 is configured to receive and detect the test penetrating light to generate the detected spectral signal. The processor 19 is coupled to the test optical sensor 141, receives the detected spectral signal, and calculates the detection result according to the detected spectral signal.

When the transmissive sensing object 133 contacts the gas to be analyzed (including at least one target constituent to be detected), the transmissive sensing object 133 changes its structure according to the kinds and the concentration of the target gas constituents. In practice, the reference object 132 may include a light transmissive object or material, such as glass with an added color-changing structure. For example, the transmissive sensing object 133 may be a light transmissive object including at least one of a DNA modified phage or a DNA unmodified phage such as described above. Therefore, the incident light penetrates the transmissive sensing object 133 to form the test penetrating light with a spectrum that depends on changes in the optical properties of sensing object 133. The transmissive sensing object 133 detects different gas components and their concentrations according to different DNA modified phage or DNA unmodified phage, or can according to same DNA modified phage or DNA unmodified phage, but not limited to this.

In order to correct detection results for environmental factors, the optical detector 300 can further include the reference object 132 and the reference optical sensor 142. The reference object 132 is configured and symmetrically arranged to receive the incident light and form a reference penetrating light. The reference optical sensor 142 is configured to receive and detect the reference penetrating light to obtain the reference spectral signal. The processor 19 is also coupled to the reference optical sensor 142, and is configured to receive the reference spectral signal to calculate the calibrated result according to the detected spectral signal and the reference spectral signal.

In order to fasten the above components, the optical detector 300 can further include a light source holder 150, the object holder 151, the sensor protective cover 153 and the sensor holder 152. As shown in FIG. 10 to FIG. 14B, the light source holder 150 is configured to fasten the light source 12, the object holder 151 is configured to fasten the transmissive sensing object 133 and the reference object 132, and the sensor holder 152 is configured to fasten the test optical sensor 141 and the reference optical sensor 142. The object holder 151 is between the light source holder 150 and the sensor holder 152 and is coupled to the light source holder 150. The sensor protective cover 153 is between the object holder 151 and the sensor holder 152, and is coupled to them respectively. When the light source holder 150, the object holder 151, the sensor protective cover 153 and the sensor holder 152 are assembled together, the gas chamber 113 is formed between the light source holder 150 and the object holder 151, and a sensor accommodated space 165 is formed between the sensor protective cover 153 and sensor holder 152. The gas chamber 113 may be isolated from the sensor accommodated space 165 by the sensor protective cover 153 for avoiding the gas to be analyzed entering the sensor accommodated space 165.

The light source holder 150 has one light source housing slot 154 and two openings 161. The light source housing slot 154 is configured to house the light source 12, and the openings 161 is configured to communicate the gas chamber 113 with the external environment for allowing the gas to be analyzed to freely enter and exit.

In order to communicate light between the gas chamber 113 with sensor accommodated space 165, the optical detector 300 further includes the first protective glass 181 and the second protective glass 182. As shown in FIG. 11 and FIG. 14B, the sensor protective cover 153 further includes two glass housing slots 157; one is configured for housing the first protective glass 181 and the other one is configured for housing the second protective glass 182. In order for the incident light to penetrate the transmissive sensing object 133 smoothly, the first protective glass 181 is in the light path of the incident light and in the light path of the test penetrating light. For the same reason, in order for the incident light to penetrate the reference object 132 smoothly, the second protective glass needs to be located between the light path of the incident light and the light path of the reference penetrating light. In addition, in order for the test optical sensor 141 to receive the test penetrating light smoothly, the test optical sensor 141 needs to be located on the light path of the test penetrating light. For the same reason, in order for the reference optical sensor 142 to receive the reference penetrating light smoothly, the reference optical sensor 142 needs to be located on the light path of the reference penetrating light. The first protective glass 181 and the second protective glass 182 are also configured to isolate the gas chamber 113 from the test optical sensor 141 and the reference optical sensor 142 to protect the test optical sensor 141 and the reference optical sensor 142 from the gas pollution.

According to the above mentioned description, the optical detector 300 is fastened by the light source holder 150, the object holder 151, the sensor protective cover 153 and the sensor holder 152 to provide a symmetrical arrangement, so that the path length of the incident light from light source 12 reaching the transmissive sensing object 133 is the same as the path length of the incident light reaching the reference object 132. For the same reason, the path length of the test penetrating light reaching the test optical sensor 141 is the same as the path length of the reference penetrating light reaching the reference optical sensor 142.

In practice, in order to make the accuracy better, the optical detector 300 can further include a temperature and humidity detector 143 coupled to the processor 19. The temperature and humidity detector 143 may be configured to detect the temperature and the humidity of the gas to be analyzed, and to generate a temperature and humidity result. The processor 19 calculates the calibrated result also according to the temperature and humidity result to improve measurement accuracy.

In practice, the reflective sensing object 131 and the transmissive sensing object 133 can sense the gas components including $NH_3$, and the volatile organic compounds, such as hydrocarbons, halogenated hydrocarbons, oxygen hydrocarbons, and nitrogen hydrocarbons. In detail, the target gas constituents may include compounds from the benzene series, organic chlorides, Freon series, organic ketones, amines, alcohols, ethers, esters, acids, and petroleum hydrocarbon compounds. When the reflective sensing object 131 or the transmissive sensing object 133, which include the DNA modified phage corresponding the gas component to be detected, contacts the gas to be analyzed including the target gas constituent to be detected, the DNA modified phage changes structure. Therefore, when the incident light enters the structure of the DNA modified phage, the structure of the DNA modified phage changes the spectrum of the incident light and forms the test reflected light or the test penetrating light.

In addition, the phage of the reflective sensing object 131 or the transmissive sensing object 133 can not only detect the gas, but also can detect suspended matter, such as solid and liquid including the components which can be detected by the corresponding phage. The components can be organic chemical, inorganic chemical and virus. Since the detecting mechanism of phage in liquid is similar to in gas which is mentioned above, it will not be repeated here.

Compared with the prior art, an optical detector 100, 200, or 300 provides contemporaneous calibration of light source emissions, various environmental factors such as temperature and humidity, and the temperature of the optical detector. The optical detector has detection specificity to avoid the influence of other non-detected gases to provide high gas composition resolution. It is not necessary to have a gas chamber with enough volume for multiple reflections, so that the optical detector can be miniaturized. In addition, the optical detector 100, 200, or 300 can has a shorter period of detection time and less power consumption in comparison with the gas detector with IR.

Although particular example implementations have been disclosed, these implementations are only examples and should not be taken as limitations. Various adaptations and combinations of features of the implementations disclosed are within the scope of the following claims.

What is claimed is:

1. An optical detector, comprising:

a gas chamber;

a light source coupled to the gas chamber and configured to emit an incident light that enters the gas chamber;

a sensing object exposed to a gas in the gas chamber, the sensing object having an optical property that depends on a composition of the gas, the sensing object being configured to receive a first portion of the incident light where the optical property transforms the first portion of the incident light into a test light;

a test optical sensor configured to receive the test light and generate a detected spectral signal that represents a spectral distribution of the test light; and a processor coupled to the test optical sensor, the processor being configured to receive the detected spectral signal and to calculate a detection result according to the detected spectral signal.

2. The optical detector of claim 1, further comprising:

a reference object exposed to the gas, the reference object being configured to receive a second portion of the incident light and produce a reference light; and a reference optical sensor configured to receive and detect the reference light to obtain a reference spectral signal that represents a spectral distribution of the reference light, wherein the processor is also coupled to the reference optical sensor, the processor being configured to receive the reference spectral signal to calculate the detection result according to the detected spectral signal and the reference spectral signal.

3. The optical detector of claim 2, wherein a path length of the first portion of the incident light reaching the sensing object is the same as a path length of the second portion of the incident light reaching the reference object, and a path length of the test light reaching the test optical sensor is the same as a path length of the reference light reaching the reference optical sensor.

4. The optical detector of claim 2, further comprising protective glass between the sensing object and the test optical sensor and between the reference object and the reference optical sensor, wherein the protective glass isolates the gas chamber from the test optical sensor and the reference optical sensor.

5. The optical detector of claim 1, wherein the sensing object comprises at least one of a DNA modified phage and a DNA unmodified phage.

6. The optical detector of claim 1, further comprising a temperature and humidity detector coupled to the processor, the temperature and humidity detector being configured to detect a temperature and a humidity of the gas and to generate a temperature and humidity result, wherein the processor calculates the calibrated result according to the detected spectral signal, the reference spectral signal, and the temperature and humidity result.

7. The optical detector of claim 1, wherein the sensing object contacts the gas and changes color according to a concentration of at least one gas component, so that the sensing object transforms the first portion of the incident light to form the test light with a spectral distribution corresponding to the concentration of the at least one gas component.

8. The optical detector of claim 1, wherein the sensing object comprises a reflective sensing object having a reflective property that depends on a composition of the gas in the gas chamber, the reflective sensing object being configured to receive the first portion of the incident light and reflect the first portion of the incident light to form the test light.

9. The optical detector of claim 1, wherein the sensing object comprises a transmissive sensing object having a transmission characteristic that depends on a composition of the gas in the gas chamber, the transmissive sensing object being configured to receive the first portion of the incident light and transmit a portion of the incident light to form the test light.

10. An optical detector comprising:

at least one light source configured to emit an incident light;

a test chamber configured to accommodate a gas to be analyzed and coupled to receive at least a portion of the incident light from the at least one light source;

a reflective sensing object exposed to the gas in the test chamber, the reflective sensing object having a reflective property that depends on a composition of the gas, the reflective sensing object being configured to receive the incident light in the test chamber and reflect the incident light to form a test reflected light;

a test optical sensor configured to receive the test reflected light to generate a detected spectral signal that represents a spectral distribution of the test reflected light; and a processor coupled to the test optical sensor, the processor being configured to receive the detected spectral signal and calculate a detection result according to the detected spectral signal.

11. The optical detector of claim 10, further comprising:

a reference chamber configured to accommodate the gas to be analyzed and coupled to receive a portion of the incident light from the at least one light source;

a reference object disposed in the reference chamber, the reference object being configured to receive the incident light in the reference chamber and reflect the incident light to form a reference reflected light; and a reference optical sensor configured to receive and detect the reference reflected light to generate a reference spectral signal that represents a spectral distribution of the reference reflected light, wherein the processor is further coupled to the reference optical sensor and is configured to receive the detected spectral signal and the reference spectral signal and to calculate a calibrated result according to the detected spectral signal and the reference spectral signal.

12. The optical detector of claim 11, wherein a path length of the incident light reaching the reflective sensing object is the same as a path length of the incident light reaching the reference object, and a path length of the test reflected light reaching the test optical sensor is the same as a path length of the reference reflected light reaching the reference optical sensor.

13. The optical detector of claim 11, further comprising at least one light splitter lens located among the test chamber, the reference chamber and one of the at least one light source, each of the at least one light splitter lens being configured to split the incident light from one of the at least one light source to the test chamber and the reference chamber.

14. The optical detector of claim 11, wherein the reference object maintains a constant reflectance under a range of temperatures and humidity conditions of the gas.

15. The optical detector of claim 11, wherein the reference object comprises ceramic, aluminum oxide, or zirconia.

16. The optical detector of claim 11, further comprising:

a first protective glass between the test chamber and the test optical sensor, and a second protective glass between the reference chamber and the reference optical sensor, wherein the first protective glass and the second protective glass isolate the test optical sensor and the reference optical sensor from the test chamber and the reference chamber.

17. The optical detector of claim 11, further comprising a temperature and humidity detector coupled to the processor, the temperature and humidity detector being configured to detect a temperature and a humidity of the gas to be analyzed, and to generate a temperature and humidity result, wherein the processor calculates the calibrated result according to the detected spectral signal, the reference spectral signal, and the temperature and humidity result.

18. The optical detector of claim 10, wherein the reflective sensing object contacts the gas to be analyzed and changes color according to a concentration of at least one gas component, so that the reflective sensing object reflects the incident light to form the test reflected light with a spectral distribution corresponding to the concentration of the at least one gas component.

19. The optical detector of claim 10, wherein the reflective sensing object is an opaque object comprising at least one of a DNA modified phage and a DNA unmodified phage.

* * * * *